United States Patent
Nielsen (10) Patent No.: US 9,601,723 B2
(45) Date of Patent: *Mar. 21, 2017

(54) ELECTROCHEMICAL DEVICE WITH CRIMP RING CLOSURE AND METHOD

(71) Applicant: Medtronic, Inc.

(72) Inventor: Christian S. Nielsen, River Falls, WI (US)

(73) Assignee: Medtronic, Inc., Minneapolis, MN (US)

(*) Notice: Subject to any disclaimer, the term of this patent is extended or adjusted under 35 U.S.C. 154(b) by 732 days.

This patent is subject to a terminal disclaimer.

(21) Appl. No.: 13/665,306

(22) Filed: Oct. 31, 2012

(65) Prior Publication Data
US 2014/0120412 A1  May 1, 2014

(51) Int. Cl.
*H01M 2/02* (2006.01)
*H01G 9/08* (2006.01)
(Continued)

(52) U.S. Cl.
CPC ......... *H01M 2/0227* (2013.01); *H01M 2/046* (2013.01); *H01M 2/0413* (2013.01);
(Continued)

(58) Field of Classification Search
CPC .... H01M 2/02; H01M 2/0202; H01M 2/0222; H01M 2/027; H01M 2/04;
(Continued)

(56) References Cited

U.S. PATENT DOCUMENTS 3,440,110 A * 4/1969 Arbter Erhard ............. 429/144
3,891,462 A   6/1975 Langkau
(Continued)

FOREIGN PATENT DOCUMENTS

JP    6222366      1/1987
JP    S62-10358    1/1987
(Continued)

OTHER PUBLICATIONS

C00002679.WOU2 (PCT/US2013/067696) PCT Notification of Transmittal of the International Search Report and the Written Opinion of the International Searching Authority, Mailed Jan. 31, 2014, 8 pages.

*Primary Examiner* — Milton I Cano
*Assistant Examiner* — Michael Dignan (57) ABSTRACT

Electrochemical device and method. The electrochemical device has an electrochemical module and an enclosure configured to enclose the electrochemical module. The enclosure has an electrically conductive first housing portion forming a first rim and an electrically conductive second housing portion forming a second rim, the first housing portion and the second housing portion, when the first rim of the first housing portion substantially abuts the second rim of the second housing portion, forming, at least in part, a volume configured to enclose the electrochemical device. The enclosure further has a substantially non-conductive grommet positioned between the first rim and the second rim, and a crimp ring engaging the first rim and the second rim, the crimp ring being configured to secure the first housing portion with respect to the second housing portion. The grommet is further positioned between the crimp ring and the first rim and the second rim.

11 Claims, 10 Drawing Sheets

(51) Int. Cl.
*H05K 13/00* (2006.01)
*H01M 2/04* (2006.01)
*H01M 10/04* (2006.01)

(52) U.S. Cl.
CPC ...... *H01M 10/0422* (2013.01); *H01M 2/0222* (2013.01); *H01M 2/0465* (2013.01); *H01M 10/0427* (2013.01); *Y10T 29/49002* (2015.01)

(58) Field of Classification Search
CPC ............. H01M 2/0404; H01M 2/0408; H01M 2/0421; H01M 2/0456; H01M 2/0465; H01M 2/0227; H01M 10/0422; H01M 2/0413; H01M 2/046; H01M 10/0427; Y10T 24/49
USPC ........................................................ 429/176
See application file for complete search history.

(56) References Cited

U.S. PATENT DOCUMENTS

| | | | | |
|---|---|---|---|---|
| 4,166,157 | A * | 8/1979 | McCormick | 429/174 |
| 4,262,414 | A | 4/1981 | Sugalski | |
| 4,263,380 | A * | 4/1981 | Riedl | 429/162 |
| 4,351,140 | A * | 9/1982 | Simpson | E04D 3/38 52/394 |
| 4,374,909 | A * | 2/1983 | Tucholski | 429/174 |
| 4,725,515 | A * | 2/1988 | Jurca | 429/174 |
| 5,853,912 | A * | 12/1998 | Naing et al. | 429/61 |
| 6,984,468 | B2 | 1/2006 | Rubino et al. | |
| 7,013,612 | B2 * | 3/2006 | Haddock | E04D 3/3608 52/528 |
| 7,022,146 | B2 | 4/2006 | Rubino et al. | |
| 2004/0166406 | A1 | 8/2004 | Higuchi et al. | |
| 2009/0233159 | A1 | 9/2009 | Phillips et al. | |
| 2010/0215996 | A1* | 8/2010 | Wendling et al. | 429/54 |

FOREIGN PATENT DOCUMENTS

| | | |
|---|---|---|
| JP | 02-112149 | 4/1990 |
| JP | 02112149 | 4/1990 |
| JP | 0869785 | 3/1996 |

* cited by examiner

ELECTROCHEMICAL DEVICE WITH CRIMP RING CLOSURE AND METHOD

FIELD

The present invention relates generally to electrochemical devices and, in particular, to electrochemical devices having multi-part housings having closures.

BACKGROUND

Electrochemical modules or devices such as batteries, capacitors and the like are well known in the art. Conventionally, such electrochemical modules are housed in an enclosure. Such enclosures commonly function to substantially isolate the electrochemical module from a surrounding environment, both to maintain the integrity of the electrochemical module and to prevent the materials of the electrochemical module from interacting with environmental materials.

One type of electrochemical module contained within an enclosure is a so-called button cell battery. Button cell batteries conventionally incorporate metallic housing portions which contact the battery contained within. As a result of the contact, each housing portion functions as an electrical contact for the battery, with one housing portion functioning as an anode contact and the other housing portion a cathode contact. A user of the button cell battery may insert the battery into a circuit such that positive and negative terminals of the circuit contact the appropriate housing portion. Consequently, utilizing a metal housing provides both protection against environmental conditions and convenient electrical contacts.

Button cell batteries, and other batteries constructed along similar lines, may further take advantage of the metallic housing to create relatively tight friction contacts between the housing portions. The housing portions may be positioned with respect to one another and then struck to create a friction fit between the two housing portions. Such friction fits have traditionally provided effective sealing against environmental interaction. Because of the general effectiveness of such metallic housings, button cell batteries and devices with similar enclosures have relied upon the friction fit between the two housing portions without the need to look to reinforcement.

But button cell batteries and similar batteries have certain limitations. In particular, because the process of striking the housing portions together relies on radial force between the inner and outer housing portions, button cell batteries are, by definition, usually circular so as to provide radial force for the friction fit. Consequently, button cell batteries may not be easily shape-adaptable to non-circular configurations. As a result, button cell batteries and the like may create inefficiencies when utilized in applications where space is at a relative premium; in circumstances like implantable medical devices and consumer electronics where the desire and long-term trend has been to make the devices as small as possible, button cell batteries and the like may be less efficient or less practical.

SUMMARY

Historically, these challenges have been addressed in part though welding housing portions together rather than utilizing radial forces. It is noted that typically feedthroughs are used when welding housing portions together to make contact with an electrode. In particular, non-circular enclosures for electrochemical modules have been created by laser welding the housing portions together. In so doing, the need for radial force to hold the housing portions together is reduced or eliminated altogether, supplanted by the weld. However, welding is relatively expensive and dependent on relatively complex and costly manufacturing processes.

An enclosure for an electrochemical module has been developed which utilizes a crimp ring to secure two housing portions with respect to one another. In an embodiment, the housing portions are insulated from each other. Because the crimp ring provides a compressive force on the housing portions rather than a radial force, the shape of the housing portions may be relatively more selectable than the circular requirements of conventional button cell batteries. In addition, the use of the crimp ring to secure the housing portions together may mean that the housing portions do not need to be strong enough to create sufficient radial force to secure the housing portions with respect to one another, as the securing force is provided by the crimp ring. Thus, the housing portions may be made of relatively less strong, and thus generally less costly, material.

However, metallic housing portions may create challenges respecting electrical isolation. Because the housing portions are typically utilized as electrode terminals for the electrochemical module contained therein, the housing portions must necessarily be electrically isolated with respect to one another to avoid creating electrical shorts. However, the use of a metallic crimp ring to secure the housing portions with respect to one another may create a short between the housing portions if the crimp ring is in contact with both housing portions. The enclosure disclosed herein incorporates grommets to provide electrical isolation between both housing portions and between the housing portions and the crimp ring. In addition to electrical isolation, the grommets may also provide fluid isolation between the interior and exterior of the enclosure.

In an embodiment, an electrochemical device comprises an electrochemical module and an enclosure configured to enclose the electrochemical module. The enclosure comprises an electrically conductive first housing portion forming a first rim and an electrically conductive second housing portion forming a second rim, the first housing portion and the second housing portion, when the first rim of the first housing portion substantially abuts the second rim of the second housing portion, forming, at least in part, a volume configured to enclose the electrochemical device. The enclosure further comprises a substantially non-conductive grommet positioned between the first rim and the second rim, and a crimp ring engaging the first rim and the second rim, the crimp ring being configured to secure the first housing portion with respect to the second housing portion. The grommet is further positioned between the crimp ring and the first rim and the second rim.

In an embodiment, the first housing portion and the second housing portion are configured to contact the electrochemical module and provide electrical contacts for the electrochemical module in first and second locations, respectively.

In an embodiment, the first housing portion and second housing portion are irregularly shaped.

In an embodiment, the first housing portion and the second housing portion each have a major surface having an edge, the edge comprising at least one linear portion.

In an embodiment, the first housing portion and the second housing portion each have a major surface having an edge, the edge comprising at least one linear portion and at least one non-linear portion.

In an embodiment, the grommet comprises a first grommet portion positioned between the first rim and the second rim and a second grommet portion being positioned between the crimp ring and the first rim of the first housing portion and between the crimp ring and the second rim of the second housing portion.

In an embodiment, the second grommet portion comprises a first segment positioned between the crimp ring and the first rim of the first housing portion and a second segment positioned between the crimp ring and the second rim of the second housing portion.

In an embodiment, the first grommet portion has a first hardness having a value, the second grommet portion has a second hardness having a value, and the value of the first hardness of the first grommet portion is less than the value of the second hardness of the second grommet portion.

In an embodiment, the crimp ring comprises opposing longitudinal edges, at least one of the first rim of the first housing portion and the second rim of the second housing portion each form a lip having a contact surface, the contact surface being configured to contact, at least in part, the first grommet portion, and at least one of the lip of the first rim of the first housing portion and the lip of the second rim of the second housing portion is configured to admit at least a portion of the second grommet portion and a respective one of the longitudinal edges of the crimp ring.

In an embodiment, the crimp ring comprises a plurality of non-continuous segments.

In an embodiment, the crimp ring engages around a periphery of the first rim of the first housing portion and the second rim of the second housing portion.

In an embodiment, a method of assembling an electrochemical device, comprising the steps of placing an electrochemical module into a first housing portion having a first rim, placing a second rim of a second housing portion in juxtaposition with the first rim of the first housing portion forming a volume enclosing the electrochemical module, positioning a first grommet portion of a grommet between and in contact with the first rim of the first housing portion and the second rim of the second housing portion, positioning a crimp ring proximate the first rim of the first housing portion and the second rim of the second housing portion with a second grommet portion of the grommet between the crimp ring and the first rim of the first housing portion and the second rim of the second housing portion, and crimping the crimp ring to engage with the first rim of the first housing portion and the second rim of the second housing portion and to secure, at least in part, the first housing portion with respect to the second housing portion and substantially seal the volume enclosing the electrochemical module.

In an embodiment, the placing the electrochemical module into the first housing portion step and the placing the second rim of the second housing portion step are configured to contact the electrochemical module and provide electrical contacts for the electrochemical module in first and second locations, respectively.

In an embodiment, the second grommet portion comprises a first segment and a second segment, the positioning a crimp ring comprises positioning the first segment of the second grommet portion between the crimp ring and the first rim of the first housing portion and positioning the second segment of the second grommet portion between the crimp ring and the second rim of the second housing portion.

In an embodiment, the crimp ring comprises opposing longitudinal edge and at least one of the first rim of the first housing portion and the second rim of the second housing portion each form a lip having a contact surface. In such an embodiment, the positioning the first grommet portion step comprises contacting the contact surface at least in part with the first grommet portion, at least one of the lip of the first rim of the first housing portion and the lip of the second rim of the second housing portion is configured to admit at least a portion of the second grommet portion and one of the longitudinal edges of the crimp ring, and the positioning the crimp ring step comprises admitting a respective one of the longitudinal edges of the crimp ring and the at least a portion of the second grommet portion within the lip of the first rim of the first housing portion and the second rim of the second housing portion.

In an embodiment, the crimp ring comprises a plurality of non-continuous segments and the crimping step comprises crimping each of the plurality of segments.

In an embodiment, the crimping step engages the crimp ring around a periphery of the first rim of first housing portion and a periphery of the second rim of second housing portion.

DESCRIPTION

Figure 1:
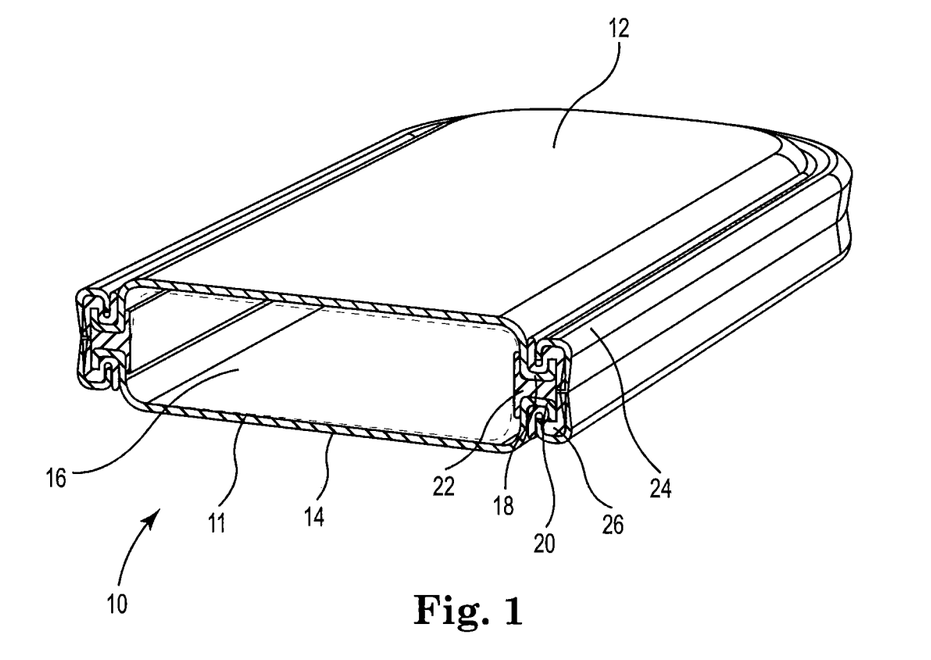
FIG. 1 is a cross-sectional perspective view of an enclosure for an electrochemical module.

FIG. 1 is a cross-sectional perspective view of an embodiment of an enclosure 10 for electrochemical module 11 (illustrated in outline to preserve interior view of enclosure 10), such as a battery or a capacitor. First housing portion 12 and second housing portion 14 generally form volume 16 configured to enclose electrochemical module 11. First housing portion 12 and second housing portion 14 form first rim 18 and second rim 20, respectively, with first rim 18 substantially abutting second rim 20. Substantially non-conductive first grommet portion 22 is positioned between first rim 18 and second rim 20 to provide, at least in part, sealing for volume 16 while still allowing first rim 18 to substantially abut second rim 20. Crimp ring 24 is configured to engage with first rim 18 and second rim 20 by way of substantially non-conductive second grommet portion 26 to secure first housing portion 12 with respect to second housing portion 14.

In various embodiments, first housing portion 12 and second housing portion 14 are comprised of a relatively resilient metal. In various embodiments, first housing portion 12 and second housing portion 14 are made from 300-series stainless steel or titanium. In such embodiments, first housing portion 12 and second housing portion 14 are electrically conductive and contact electrochemical module 11 so as to provide electrical contacts at locations to allow electrical access to electrochemical module from outside of enclosure 10. In various such embodiments, first housing portion 12 and second housing portion 14 are made from metals with relatively high resiliency, such as 400-series stainless steel or other metals, ceramics or polymers. The use of metals which are somewhat, though not extremely, resilient and, as a general consequence less costly may, in part, be possible owing, at least in part, to crimp ring 24. A lubricant may be used in the crimping process. Such lubricant can take the form of nickel plating on crimp ring 24, a PTFE or similar film or other lubricants.

In various embodiments, crimp ring 24 is comprised of a relatively resilient metal, in various embodiments a metal more resilient than the metal of first housing portion 12 and second housing portion 14. In an embodiment, crimp ring 24 is comprised of 400-series stainless steel. Alternatively, crimp ring 24 may be made of any material which meets the requirements for strength and resiliency described herein. While in certain embodiments, crimp ring 24 is not electrically conductive, in various embodiments, crimp ring 24 is made of a conductive material. In various embodiments, crimp ring 24 has a resistivity of less than approximately 0.00006 ohm-centimeters.

Because crimp ring 24 is relatively strong and resilient, crimp ring 24 may be struck to engage first rim 18 and second rim 20 to secure first housing portion 12 with respect to second housing portion 14. Because crimp ring 24 provides most if not all of the force needed to secure first housing portion 12 with respect to second housing portion 14, first housing portion 12 and second housing portion 14 may not need to be as strong or resilient as they may need to be if first housing portion 12 and second housing portion 14 were used to provide the force to secure first housing portion 12 with respect to second housing portion 14, as in a button cell battery. Thus, first housing portion 12 and second housing portion 14 may be made of relatively less strong or resilient material which may, in various circumstances, reduce the cost, weight and size of first housing portion 12 and second housing portion 14. Because first housing portion 12 and second housing portion 14 are, in various embodiments including that of FIG. 1, significantly larger than crimp ring 24, the cost of enclosure 10 may be reduced relative to an enclosure without crimp ring 24 and first housing portion 12 and second housing portion 14 being made of relatively strong or resilient material, such as conventional button cell batteries, as discussed above.

In various embodiments, first grommet portion 22 and second grommet portion 26 are selectable from various substantially impermeable and non-electrically conductive materials. Such materials include, but are not limited to, polyether ether ketone ("PEEK") polymer, polyphenylene sulfide ("PPS") polymer, polypropylene ("PP"), hydrogenated nitrile rubber ("HNBR", also known in the art as "highly saturated nitrile" or "HSN"), polyvinylidene fouride ("PVDF") and a flouroelastomer. In various embodiments, first grommet portion 22 is made from hydrogenated nitrile rubber, which is material with a relatively high hardness value albeit less so than, for instance, PEEK polymer. While relatively hard materials may be utilized, somewhat softer materials such as hydrogenated nitrile rubber may advantageously provide improved resistance to gas and fluid flow into or out of volume 16 over relatively hard materials when first housing portion 12 and second housing portion 14 are secured with respect to one another by crimp ring 24.

In such embodiments, first grommet portion 22 and second grommet portion 26 are substantially non-electrically conductive to prevent electrical shorting between first housing portion 12, second housing portion 14 and crimp ring 24. Accordingly, the materials listed above with respect to first grommet portion 22 and second grommet portion 26 may have relatively high dielectric strengths. For instance, PEEK has a dielectric strength of approximately nineteen (19) kilovolts per millimeter, PVDF has a dielectric strength of approximately ten (10) kilovolts per millimeter and polypropylene has a dielectric strength of approximately twenty-three (23) kilovolts per millimeter. In various embodiments, alternative materials may be utilized for first grommet portion 22 and second grommet portion 26 which have similar dielectric strengths to those of the above embodiments.

To In an embodiment, first grommet portion 22, in combination with first housing portion 12, second housing portion 14, second grommet portion 26 and crimp ring 24, provides a hermetic seal for volume 16. In alternative embodiments, first grommet portion 22 substantially seals volume 16 without necessarily achieving the standards for a complete hermetic seal. In certain such embodiments, volume 16 has a leak rate of approximately $1 \times 10^{-8}$ standard cubic centimeters of helium per second.

In an embodiment, first grommet portion 22 and second grommet portion 26 are each comprised of hydrogenated nitrile rubber. In alternative embodiments, second grommet portion 26 may be configured to have a relatively higher second hardness value than a first hardness value of first grommet portion 22. Because second grommet portion 26 is positioned between crimp ring 24 and first rim 18 and second rim 20, second grommet portion 26 may be comprised of a material which can withstand the force directly imparted by crimp ring 24. In various embodiments, second grommet portion 26 is made from a relatively strong and resilient material such as PEEK polymer and PPS polymer.

In an alternative embodiment, first grommet portion 22 and second grommet portion 26 are a single manufactured grommet configured to be positioned between and around first rim 18 and second rim 20. In such an embodiment, the single grommet thereby provides sealing between first rim 18 and second rim 20 and electrical isolation between first housing portion 12, second housing portion 14 and crimp ring 24. In an embodiment, the single grommet which comprises both first grommet portion 22 and second grommet portion 26 is made from hydrogenated nitrile rubber.

Crimp ring 24 is configured to exert a compressive force on first rim 18 and second rim 20 to secure first housing portion 12 with respect to second housing portion 14. In an embodiment, crimp ring 24 exerts a compressive force of approximately four thousand (4000) pounds/approximately eighteen (18) kiloNewtons. As noted above, in various embodiments, crimp ring 24 is formed from stainless steel, in an embodiment 400-Series stainless steel. Alternative materials which can provide the compressive force on first rim 18 and second rim 20 needed to secure first housing portion 12 with respect to second housing portion 14 and provide an appropriate leak rate as described above may be utilized.

Figure 2:
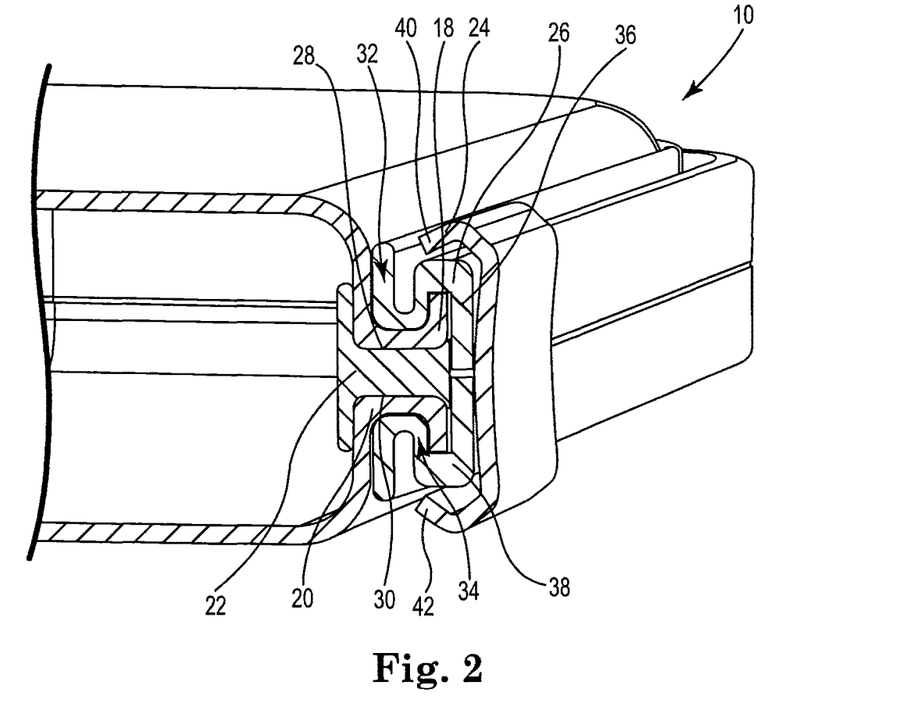
FIG. 2 is a cross-sectional view of the enclosure of FIG. 1.

FIG. 2 is a cross-sectional view of enclosure 10. First rim 18 and second rim 20 each form a curled lip to create contact surfaces 28 and 30, respectively, and channels 32 and 34, respectively. In various embodiments, first rim 18 and second rim 20 are from approximately one (1) millimeter wide to approximately three (3) millimeters wide. Contact surfaces 28 and 30 provide a contact interface with first grommet portion 22. Channels 32, 34 are configured to admit a portion of at least one of crimp ring 24 and second grommet portion 26.

In the illustrated embodiment, second grommet portion 26 comprises two pieces, first segment 36 and second segment 38. In such an embodiment, the two segments 36 and 38 may provide for a relatively less complicated manufacturing process than may be required for a second grommet portion 26 formed of a single piece and which is wrapped about first rim 18 and second rim 20. Each segment 36, 38 may be configured to be admitted in a respective channel 32, 34 of first rim 18 and second rim 20, respectively. Longitudinal edges 40, 42 of crimp ring 24 are configured to be admitted within channels 32 and 34 by way of first segment 36 and second segment 38, respectively, to provide compressive force on first rim 18 and second rim 20 to secure first housing portion 12 with respect to second housing portion 14.

Figure 3:
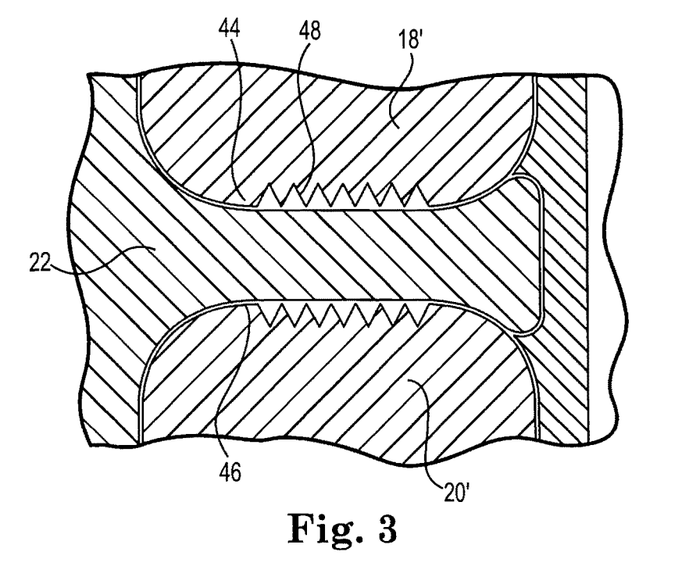
FIG. 3 is an enhanced cross-sectional view of the enclosure of FIG. 1.

FIG. 3 is an enhanced cross-sectional view of first rim 18', second rim 20' and first grommet portion 22. In particular, FIG. 3 illustrates an embodiment in which contact surfaces 44 and 46 are roughened to improve engagement with first grommet portion 22 over the smooth surfaces of contact surfaces 28, 30 illustrated in FIG. 2. In the illustrated embodiment, contact surfaces 44, 46 have grooves 48 to improve engagement with first grommet portion 22. Alternatively, contact surfaces 44, 46 may be dimpled or otherwise marred so as to improve engagement with first grommet portion 22.

In further embodiments, first grommet portion 22 may incorporate grooves or other marring to promote engagement. Such marring may be instead of or in supplement to similar marring on contact surfaces 44, 46. In an embodiment, first grommet portion 22 incorporates one or more triangular projections configured to engage with contact surfaces 44, 46. The triangular projections may be configured to interface with individual grooves 48. Alternatively, a single large triangular projection of first grommet portion 22 corresponding to each contact surface 44, 46 may enhance a friction fit of first grommet portion 22 with contact surfaces 44, 46 without respect to interfacing with individual grooves 48.

Figure 4A:
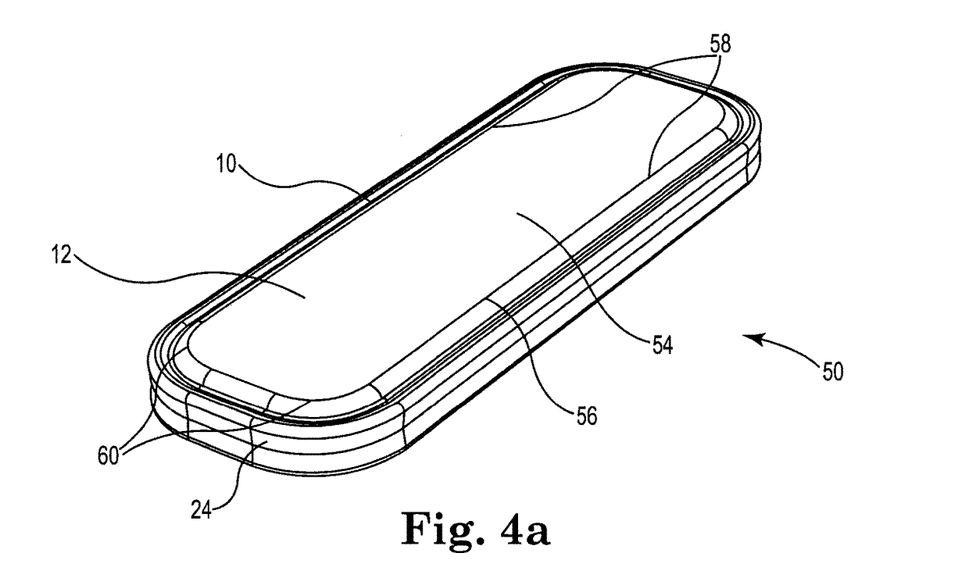
FIGS. 4a and 4b are perspective views of different embodiments of the enclosure of FIG. 1.
Figure 4B:
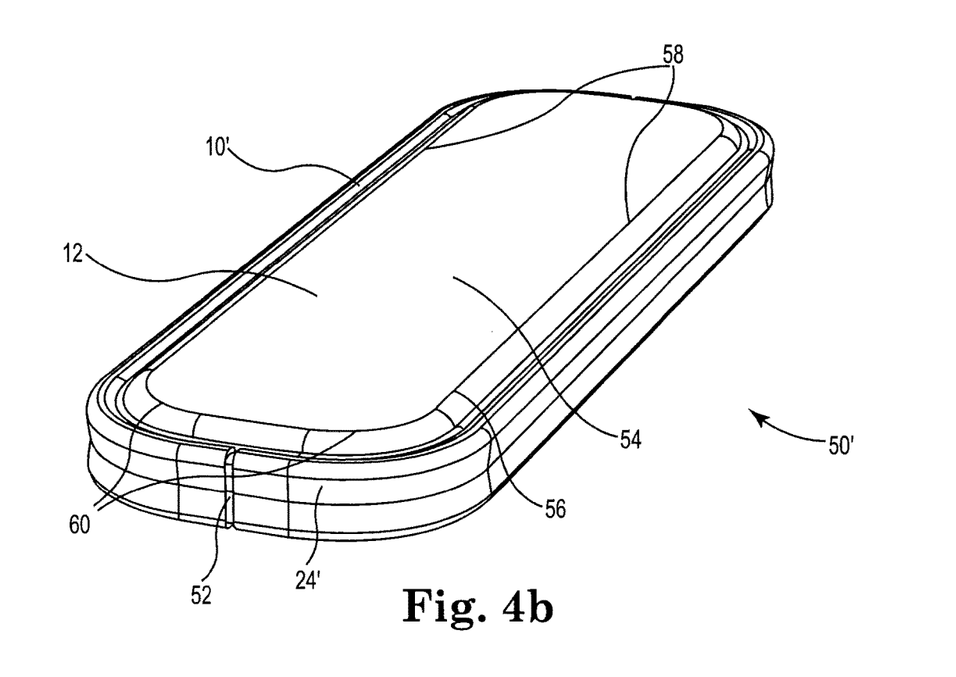

FIGS. 4a and 4b are perspective views of electrochemical devices 50 and 50', respectively, having enclosures 10 and 10', respectively, each enclosing electrochemical module 11. In an embodiment, enclosures 10 and 10' have dimensions of approximately five (5) centimeters by approximately two (2) centimeters. It will be apparent that the dimensions of components such as first housing portion 12, second housing portion 14, crimp ring 24, first grommet portion 22 and second grommet portion 26 are selectable and configurable depending on the selected dimensions of enclosures 10 and 10'.

Figure 7:
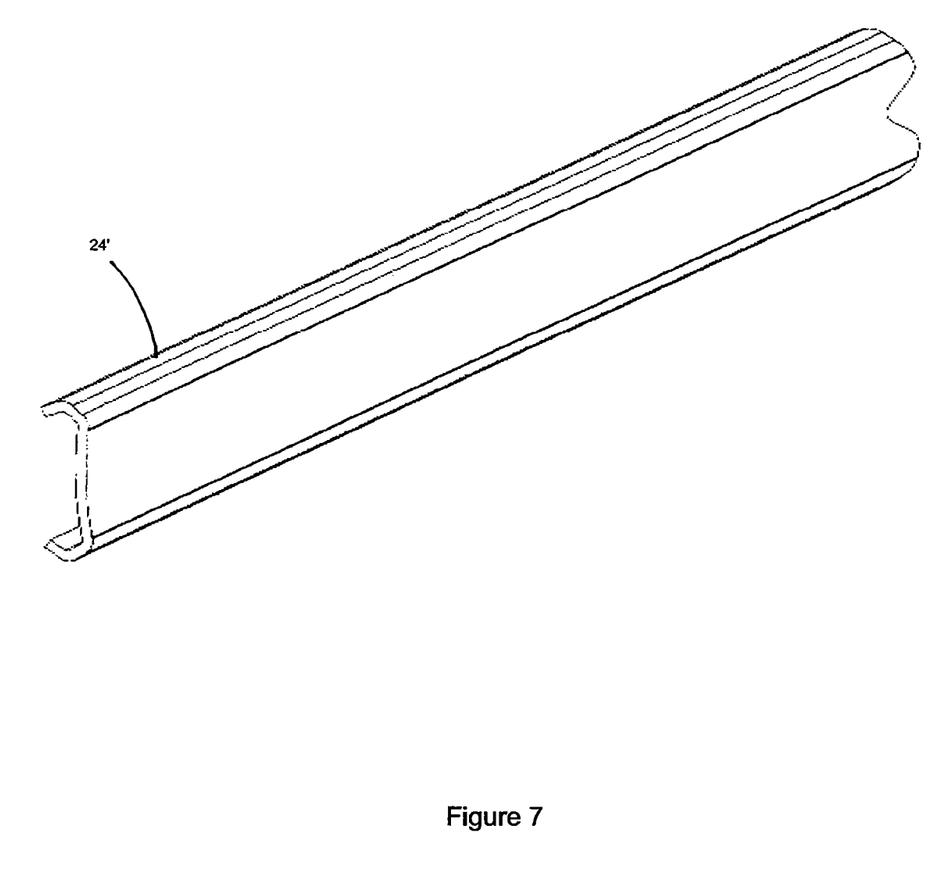
FIG. 7 illustrates an embodiment of a crimp ring for use with the enclosure.

In the embodiment of FIG. 4a, crimp ring 24 of enclosure 10 is a single ring without a gap or split (such as illustrated in FIG. 7). Such a crimp ring 24 may be positioned about the periphery of first rim 18 and second rim 20 and then struck on either side so that ends or edges 40, 42 seat as shown in FIG. 1 above. In the embodiment of FIG. 4b, crimp ring 24' of enclosure 10' includes one or more gaps 52, in various embodiments either extending through crimp ring 24', causing crimp ring 24' to have non-continuous segments, or not extending through crimp ring 24' and causing crimp ring to have segments which are coupled with respect to one another. In such embodiments, crimp ring 24' may be wrapped about the periphery of enclosure 10' and struck to secure first housing portion 12 to second housing portion 14 (obscured) as described above. Alternatively, crimp ring 24' may be comprised of multiple crimp ring segments, each separated by a gap 52 or seam, each of which is separately positioned with respect to the remainder of enclosure 10'. Crimp ring 24' may be relatively easier to manufacture than crimp ring 24. However, crimp ring 24' may be relatively weaker than crimp ring 24. In such embodiments, though, crimp ring 24' may nevertheless provide adequate compressive force to secure first housing portion 12 with respect to second housing portion 14.

As illustrated, first housing portion 12, and similarly second housing portion 14, has major surface 54 having edge 56 which, in various embodiments, includes first rim 18. Edge 56 of first housing potion 12 is irregularly shaped, including both straight portions 58 and curved portions 60. Though not illustrated, an edge of second housing portion 14 may be similarly irregularly shaped. Because of the irregular shape of edge 56 and, by extension, first housing portion 12, the techniques utilized in alternative electrochemical devices, such as the radial forces exerted by the enclosure of button cell batteries, may not be available. In various embodiments, crimp ring 24 provides adequate force to hold first housing portion 12 and second housing portion 14 with respect to one another despite the irregular shape.

Figure 5:
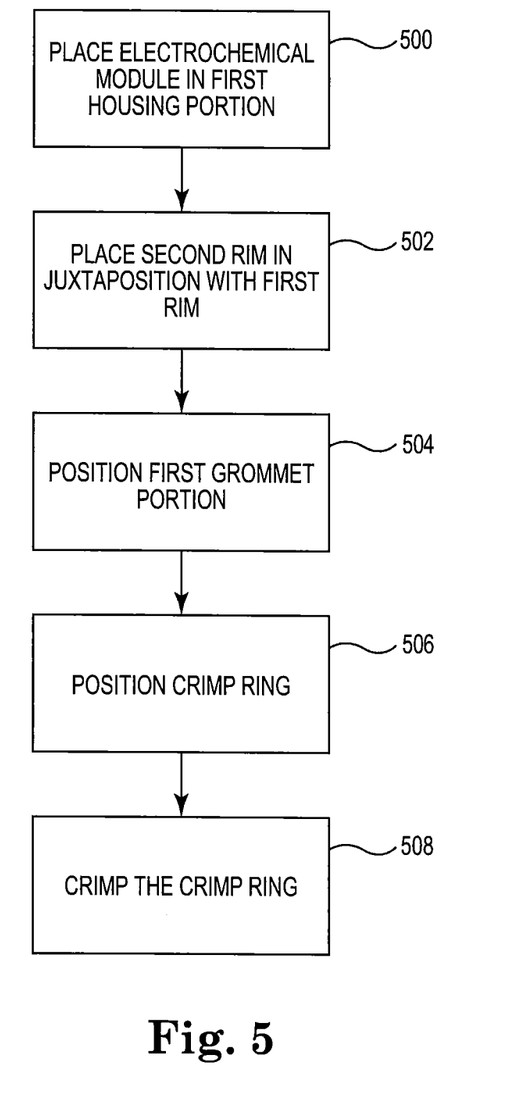
FIG. 5 is a flowchart for making an enclosure for an electrochemical module.

FIG. 5 is a flowchart for assembling electrochemical device 50. Electrochemical module 11 is placed (500) in first housing portion 12. Second rim 20 of second housing portion 14 is placed (502) in juxtaposition with first rim 18 of first housing portion 12 forming volume 16 enclosing electrochemical module 11. First grommet portion 22 is positioned (504) between and in contact with first rim 18 and second rim 20. Crimp ring 24 is positioned (506) proximate first rim 18 and second rim 20 with second grommet portion 26 between crimp ring 24 and first housing portion 12 and second housing portion 14. Crimp ring 24 is crimped (508) to engage with first rim 18 and second rim 20 to secure, at least in part, first housing portion 12 with respect to second housing portion 14 and substantially seal volume 16.

Figure 6:
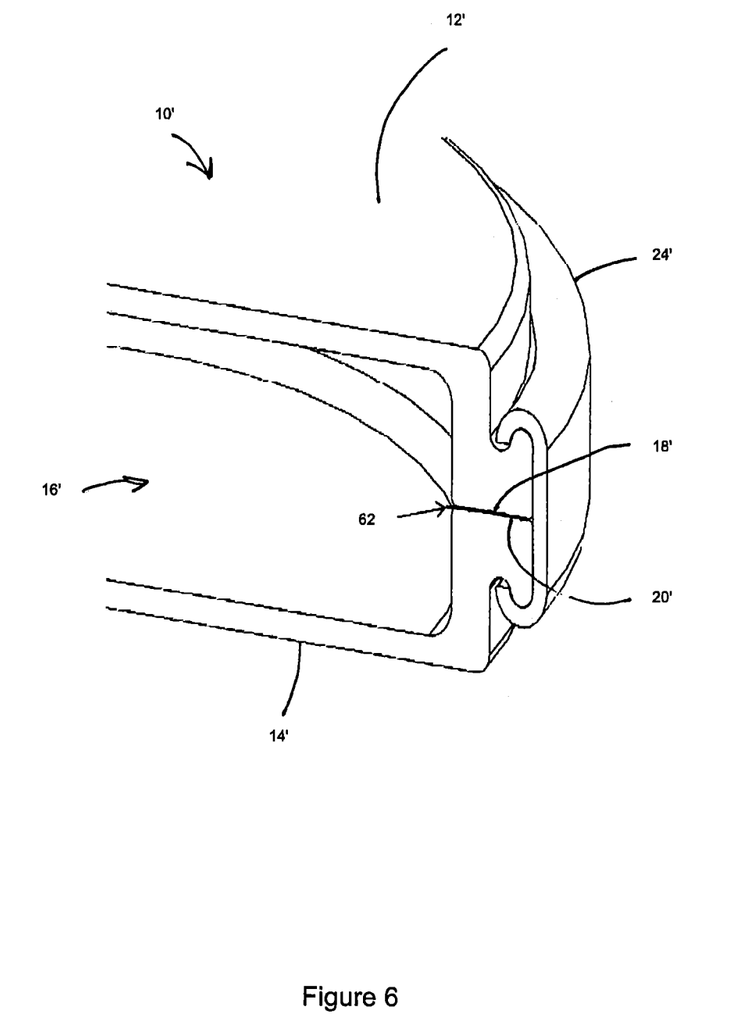
FIG. 6 is a partial cross-sectional view of an alternative embodiment of the enclosure.

FIG. 6 is a partial cross-sectional view of an alternative embodiment illustrated as enclosure 10'. Enclosure 10' is formed from first housing portion 12' and second housing portion 14' forming volume 16'. Similar to enclosure 10, enclosure 10' is closed and sealed with crimp ring 24' at first rim 18' of first housing portion 12' and second rim 20' of second housing portion 20'. Notably, enclosure 10' differs from enclosure 10 by the omission of grommet (22 and 26). In an embodiment, first rim 18' of first housing portion 12' directly mates with second rim 20' of second housing portion 20'. In this embodiment, first rim 18' and second rim 20' provide a seal for enclosure 10'. In an embodiment, first rim 18' of first housing portion 12' mates with second rim 20' of second housing portion 20' sealed with sealer 62 which assists with first rim 18' sealing with second rim 20'.

In the embodiment illustrated, first rim 18' and second rim 20' are generally flat providing a sealable mating surface. It is to be recognized and understood, however, that the mating surface formed by first rim 18' and second rim 20' may take other forms and equally, or potentially better, sealable. For example, it is contemplated first rim 18' and second rim 20' could form a complementary mating cross-section, such as an interlock formed with a "V" cross-sectional shape and a complementary "V-groove" cross-sectional shape in first rim 18' and second rim 20', respectively. It is also contemplated that a sealing surface could be formed with other cross-sectional shapes such as a round into a groove. Such non-flat mating surfaces may actually provide a better seal than the flat cross-sectional surfaces of first rim 18' and second rim 20' illustrated.

In an embodiment, sealing material 62, such as a silicone sealant, could be added between mating rims in all embodiments. For example, sealing material 62 may be used between first rim 18' and second rim 20' in enclosure 10'. It is also recognized that sealing material 62 could be used with first rim 18 and second rim 20 of enclosure 10.

In an embodiment, first housing portion 12 and second housing portion 14 are formed of a non-conductive polymer. FIG. 7 illustrates an embodiment of crimp ring 24', configured to engage with first rim 18 and second rim 20 to secure first housing portion 12 with respect to second housing portion 14, is comprised of a relatively resilient metal, in various embodiments a metal more resilient than first housing portion 12 and second housing portion 14. In an embodiment, crimp ring 24' is comprised of 400-series stainless steel. Alternatively, crimp ring 24' may be made of any material which meets the requirements for strength and resiliency described herein. While in certain embodiments, crimp ring 24' is not electrically conductive, in various embodiments, crimp ring 24' is made of a conductive material. In various embodiments, crimp ring 24' has a resistivity of less than approximately 0.00006 ohm-centimeters. Because crimp ring 24' is relatively strong and resilient, crimp ring 24' may be struck to engage first rim 18 and second rim 20 to secure first housing portion 12 with respect to second housing portion 14. Crimp ring 24' may be formed as a continuous strip which may be formed around the outside edges of first housing portion 12 and second housing portion 14 or may be cut to length.

Figure 8:
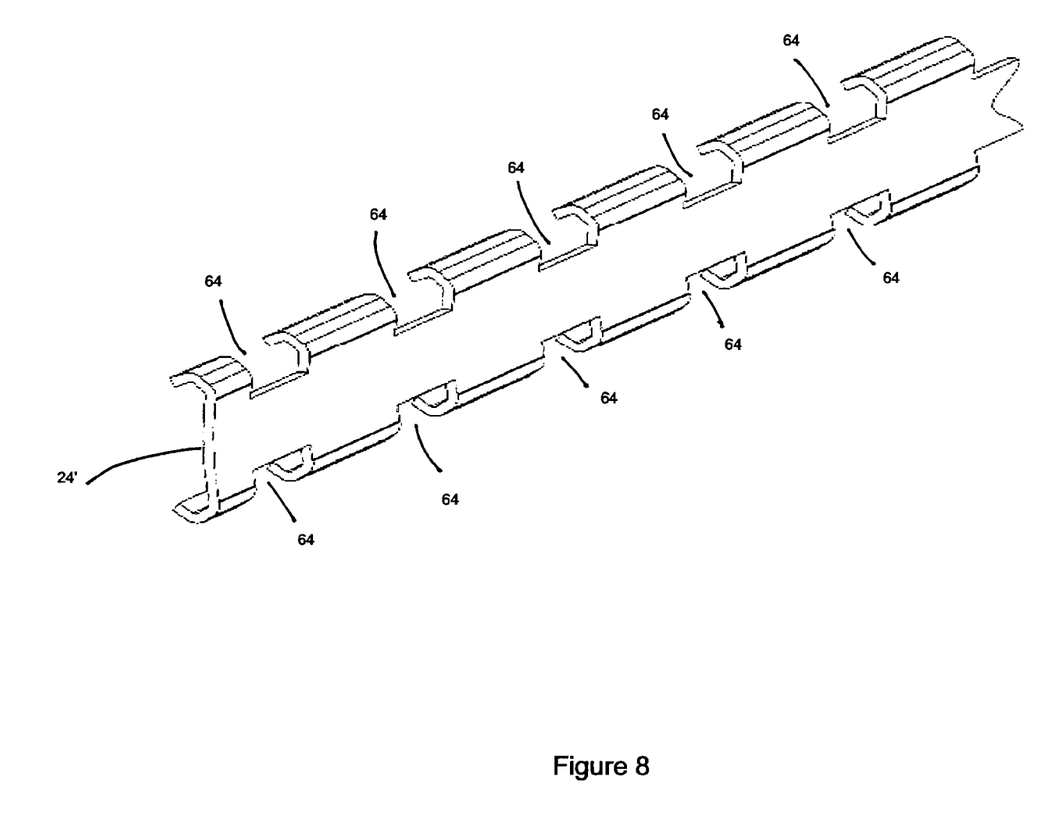
FIG. 8 illustrates an alternative embodiment of the crimp ring.
Figure 9:
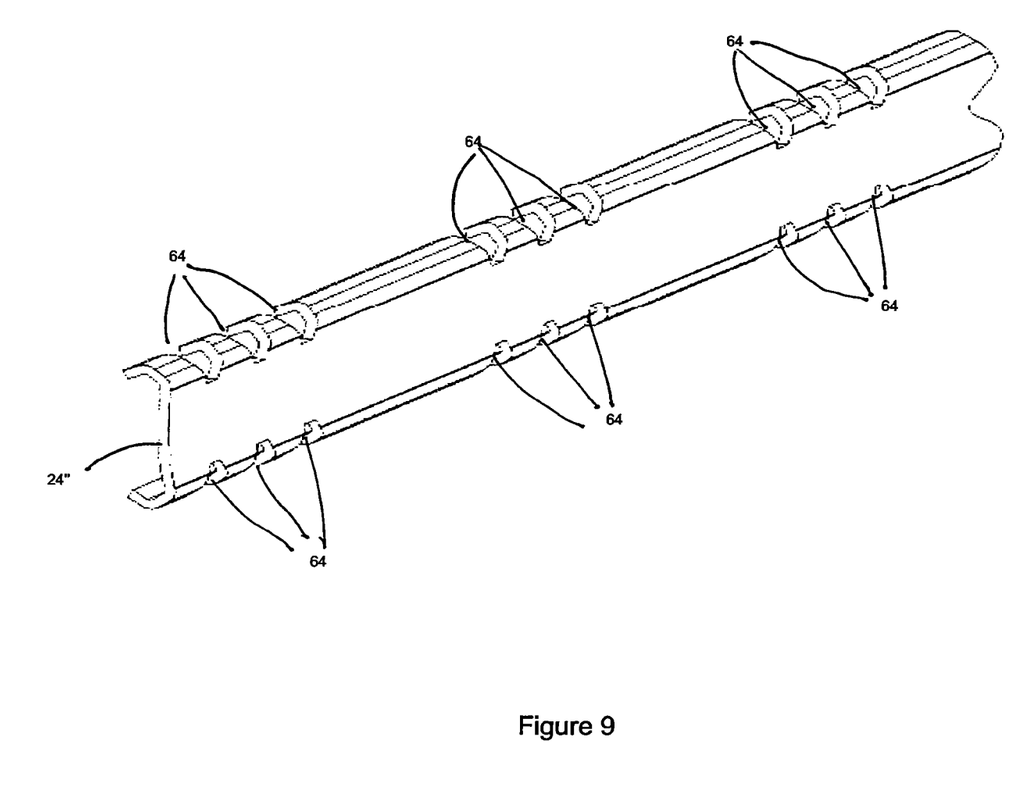
FIG. 9 illustrates another alternative embodiment of the crimp ring.
Figure 10:
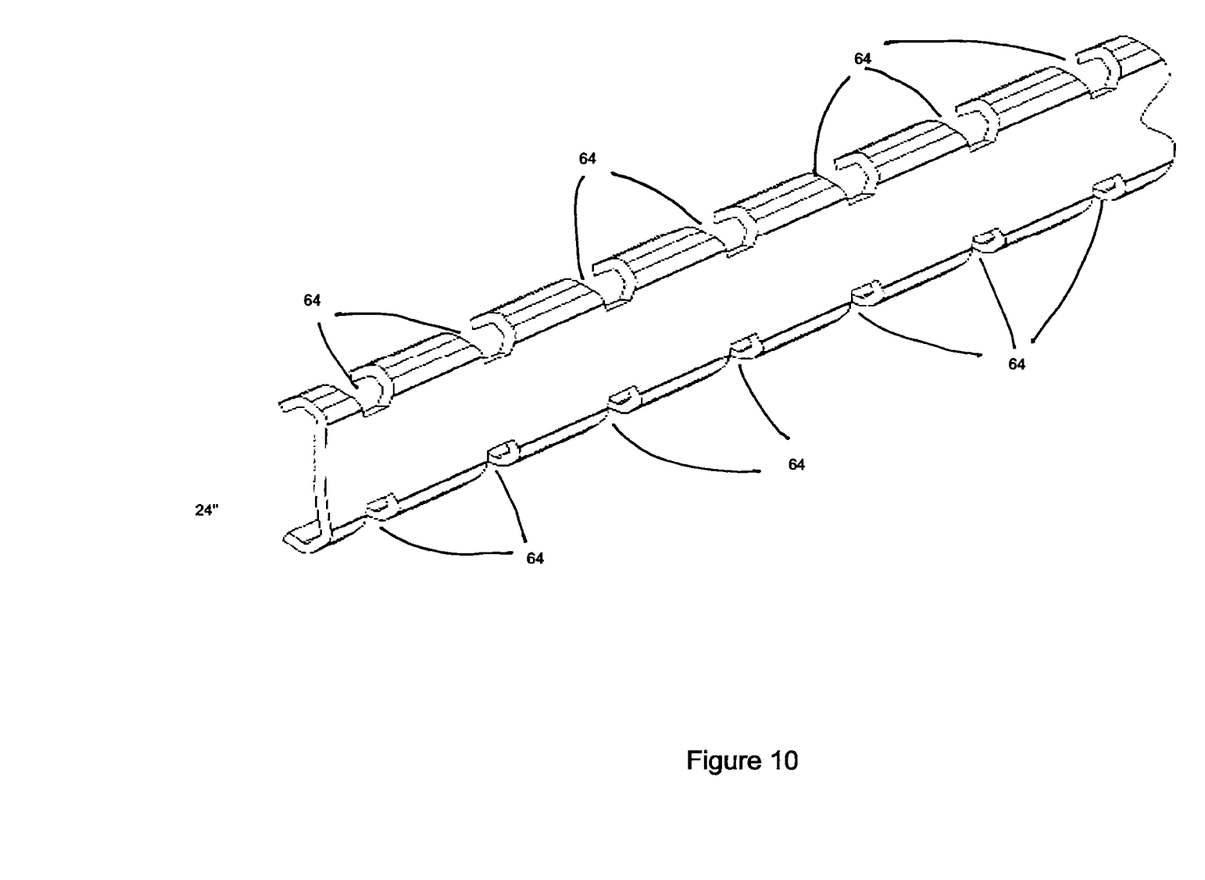
FIG. 10 illustrates a still further alternative embodiment of the crimp ring.
Figure 11:
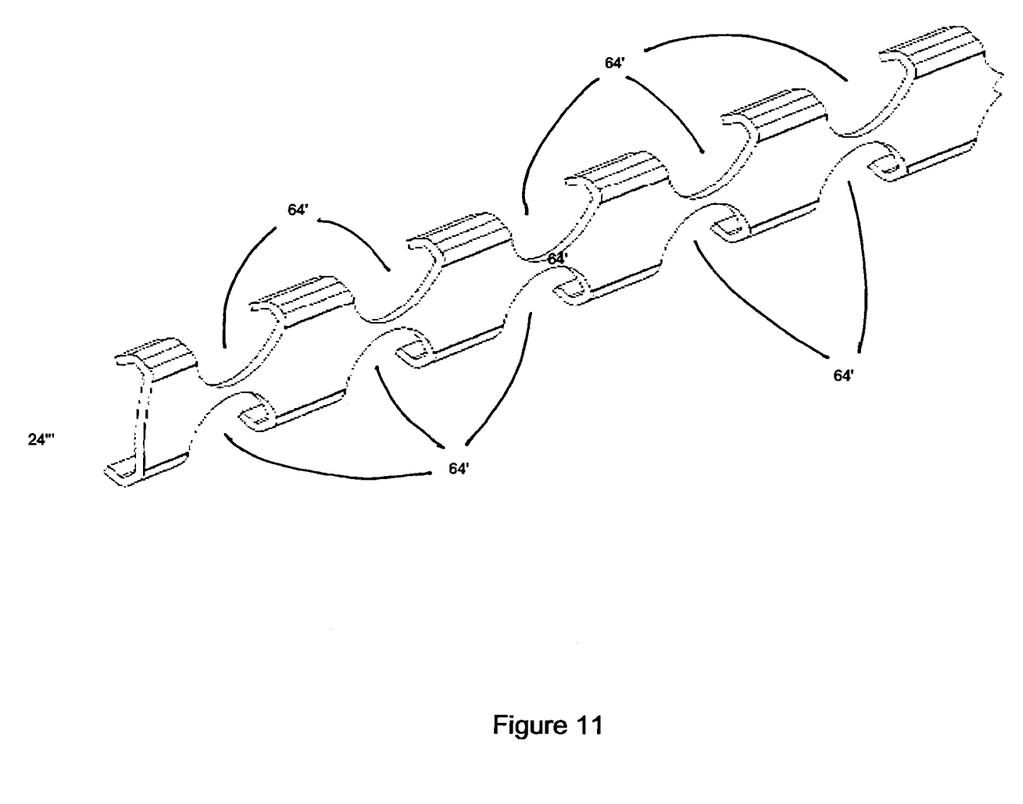
FIG. 11 illustrates still yet another alternative embodiment of the crimp ring.

FIG. 8 illustrates an alternative embodiment of crimp ring 24, 24'. Crimp ring 24" is still continuous in the strip. However, crimp ring 24" contains a series of notches, or cut-out portions, 64 which allow crimp ring 24" to be more easily formed around an exterior form of first housing portion 12 and second portion 14, especially when the exterior form of first housing portion 12 and second housing portion 14 around which crimp ring 24" is to be utilized is not linear but rather may have a non-linear, or perhaps, arcuate shape. In the embodiment illustrated in FIG. 8, crimp ring 24" has corresponding notches 64 on each side of crimp ring 24". Although shown in FIG. 8 as notches 64 being approximately equally longitudinally spaced along crimp ring 24", it is also contemplated that notches 64 may be unequally longitudinally spaced, or that notches 64 may be of uneven width, so as to accommodate a differing arcuate shape of exterior of first housing portion 12 and second housing portion 14. If, for example, first housing portion 12 and second housing portion 14 have a greater radius of curvature, it may be desirable for some notches 64 to be closer together longitudinally, as illustrated in FIG. 9, or to have a greater number of notches 64 in an equal longitudinal distance along crimp ring 24", as illustrated in FIG. 10. In an embodiment illustrated in FIG. 11, crimp ring 24" has notches 64' which are formed from a different cross-section than notches 64 of FIG. 8. In particular, notches 64 of FIG. 8 have a roughly rectangular cross-section with sharp corners. In contrast, notches 64' of FIG. 11 have a cross-section, all or a portion of which, is arcuate rather than linear. That is, notches 64' in FIG. 11 form a circular or oval pattern in crimp ring 24". It is to be recognized and understood that the combination of strips, lengths of segments of crimp ring 24', 24", 24"' is virtually endless as are the contours of notches 64, 64' so as to facilitate the rounding of corners of enclosures 10, 10' and like areas of constraint.

Thus, embodiments of an enclosure for an electrochemical module 11 and method are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. An electrochemical device, comprising:
   an electrochemical module; and
   an enclosure configured to enclose said electrochemical module having a side wall, comprising:
      an electrically conductive first housing portion forming a first rim having a first curled lip creating a first contact surface around and orthogonal to said side wall and a first channel opposite said first contact surface;
      an electrically conductive second housing portion forming a second rim having a second curled lip creating a second contact surface around and orthogonal to said side wall and a second channel opposite said second contact surface, said first housing portion and said second housing portion, when said first contact surface of said first rim of said first housing portion substantially abuts said second contact surface of said second rim of said second housing portion, forming, at least in part, a volume configured to enclose said electrochemical device;
      a substantially non-conductive grommet positioned between said first contact surface of said first rim and said second contact surface of said second rim;
      a crimp ring engaging said first channel of said first rim and said second channel of said second rim with a compressive force, said crimp ring being configured to secure said first housing portion with respect to said second housing portion; and
      said grommet being further positioned between said crimp ring and said first curled lip of said first rim and second curled lip of said second rim.

2. The electrochemical device of claim 1 wherein said first housing portion and said second housing portion are configured to contact said electrochemical module and provide electrical contacts for said electrochemical module in first and second locations, respectively.

3. The electrochemical device of claim 1 wherein said first housing portion and second housing portion are irregularly shaped.

4. The electrochemical device of claim 3 wherein said first housing portion and said second housing portion each have a major surface having an edge, wherein said edge comprises at least one linear portion.

5. The electrochemical device of claim 3 wherein said first housing portion and said second housing portion each have a major surface having an edge, wherein said edge comprises at least one linear portion and at least one non-linear portion.

6. The electrochemical device of claim 1 wherein said grommet comprises:
   a first grommet portion positioned between said first rim and said second rim; and
   a second grommet portion being positioned between said crimp ring and said first rim of said first housing portion and between said crimp ring and said second rim of said second housing portion.

7. The electrochemical device of claim 6 wherein said second grommet portion comprises a first segment positioned between said crimp ring and said first rim of said first housing portion and a second segment positioned between said crimp ring and said second rim of said second housing portion.

8. The electrochemical device of claim 6 wherein said first grommet portion has a first hardness having a value, wherein said second grommet portion has a second hardness having a value, and wherein said value of said first hardness of said first grommet portion is less than said value of said second hardness of said second grommet portion.

9. The electrochemical device of claim 6:
   wherein said crimp ring comprises opposing longitudinal edges; and
   wherein at least one of said first rim of said first housing portion and said second rim of said second housing portion form a lip having a contact surface, said contact surface being configured to contact, at least in part, said first grommet portion; and
   wherein each of said lip of said at least one of said first rim of said first housing portion and said lip of said second rim of said second housing portion is configured to admit at least a portion of said second grommet portion and a respective one of said longitudinal edges of said crimp ring.

10. The electrochemical device of claim 1 wherein said crimp ring comprises a plurality of non-continuous segments.

11. The electrochemical device of claim 1 wherein said crimp ring engages around a periphery of said first rim of first housing portion and said second rim of second housing portion.

* * * * *